United States Patent Office 3,527,509
Patented Sept. 8, 1970

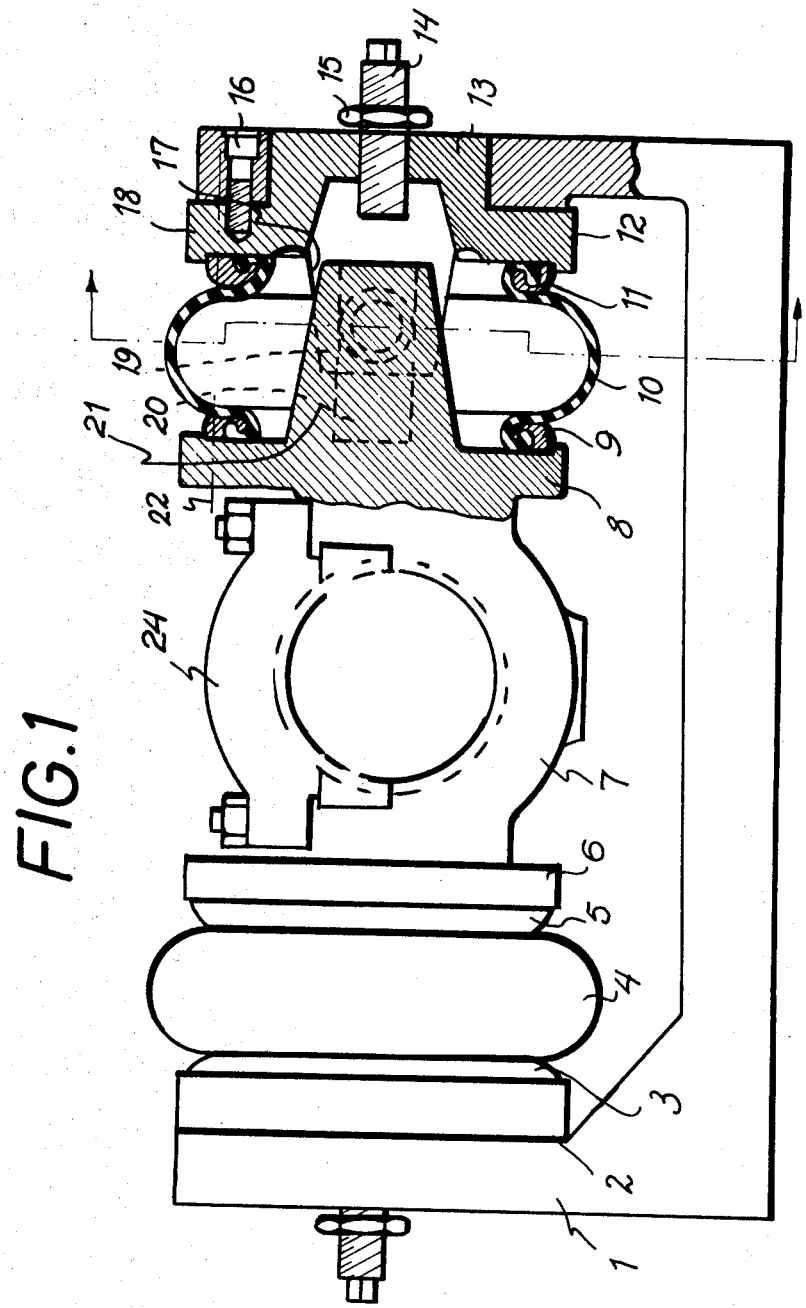

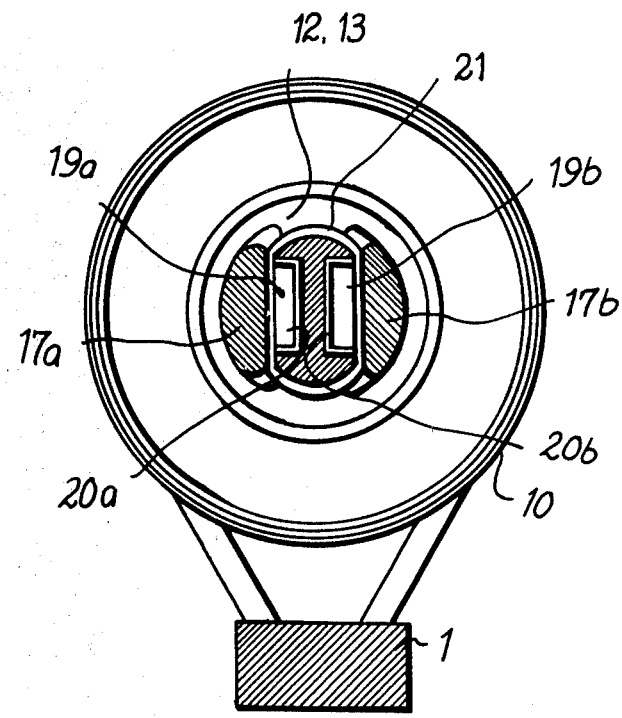

3,527,509
ADJUSTABLE BEARING FOR LATERAL CONTROL OF TRAVELLING WEBS
Erlend Eikenes, Oslo, Norway, assignor to Aktieselskabet Thunes Mekaniske Vaerksted, Oslo, Norway
Filed Dec. 2, 1968, Ser. No. 780,524
Int. Cl. F16c 33/78
U.S. Cl. 308—6
2 Claims

ABSTRACT OF THE DISCLOSURE

The invention relates to an adjustable bearing for lateral control of travelling webs. The bearing is displaceably mounted in the base by means of linear displacement bearings encapsulated in bellow means on either side of the adjustable bearing, thereby ensuring linear movement of the adjustable bearing and a protection of the displacement bearings from external influence, e.g. soiling.

---

The present invention relates to an adjustable bearing for lateral control of travelling webs, e.g. a paper wire in a paper machine.

In order to adjust the position of a travelling web in lateral direction, one means which has been used to advantage comprises in principle a roll over which the web runs, the roll being mounted at least at one end in a bearing capable of being displaced so that the direction of the longitudinal axis is displaced from its normal position at right angles to the direction of travel of the web. The displacement of the bearing takes place in accordance with an impulse from a sensing member which senses the edge of the web.

Several such adjustable bearings are known, and all have proved useful. They are all possessed of the same disadvantage, however, in that the movable members, the displacing member or organs and the displacing bearings, are open and become quickly soiled. In the paper industry particularly this is a great disadvantage, and such adjustable bearings must be cleaned fairly frequently in order to ensure correct function.

The object of the present invention is to provide an adjustable bearing where the movable members are entirely protected from external influence, for instance soiling. It is a further object to provide an adjustable bearing having a compact and strong embodiment, displacement bearings with a minimum of friction and positive and linear movement of the adjustment bearing.

In accordance with the invention these objects are achieved by providing an adjustable bearing for lateral control of travelling webs, e.g. a paper wire, said bearing comprising pneumatical or hydraulical operated displacement bellow means arranged on either side of the bearing between the bearing and the base, characterised in that the bearing is displaceably mounted in the base by means of in the bellow means encapsulated linear displacement bearings.

The bellows are connected to a fluid source, e.g. a pneumatic source, and displacement of the bearing occurs in accordance with impulses from a sensor which, in manner known per se, senses the edge of the web. By encapsulating the displacement bearings with bellows fastened between the bearing and the base, the displacement bearing is wholly protected from external influence, for example water, pulp and dust. The displacement bearings may then be effected as e.g. sensitive needle bearings which again permit of a mounting having very little friction. The bellows may be of dimension such as to yield an excess of power, and a very even movement may then be imparted to the bearing.

The bearing is preferably provided on either side with a projecting portion having grooves for reception of and cooperation with the correspondingly dimensioned rolls mounted in the base. These rolls are preferably mounted in the base by means of needle bearings.

The invention is explained more fully in the following with reference to the preferred embodiment example shown on the drawing.

On the drawings,

FIG. 1 shows a sketch of an adjustable bearing according to the invention, partly intersected, and FIG. 2 shows a section along line II—II in FIG. 1.

The actual bearing is formed as a spherical bearing having lower shell 7 and upper shell 24. The lower shell is provided on either side with a flange 6, 8 and a projection 21 projecting in diametrically opposing relationship. Grooves 20a and 20b (FIG. 2) are provided in each of the vertical side surfaces of the projection, said grooves receiving and cooperating with rolls 19a and 19b, respectively. These rolls are suitably mounted in respective projection 17a, 17b. The rolls may, for example, be mounted on a bolt by means of needle bearings, known per se. The projections 17a, 17b project from a cup shaped portion 13 having a flange 12 and 2 respectively. By means of screws 16 the cup shaped portion 13 is screwed into a base 1. Bellows 4, 10 are fastened between the bearing 7, 24 and the base 1, i.e. in this case between the respective flanges 6 and 8 of the bearing and the respective flanges 2 and 12 on the cup shaped members 13 screwed into the base 1. Said bellows are fastened by means of holding rings 3, 5, 9 and 11 which by means of screws 18 and 22 indicated only by center lines, are screwed to the respective flanges and maintain the bellows in position. The bellows may be connected to a fluid source by connection means (not shown).

A stopper in the form of a screw 14 is screwed into each of the cup shaped members 13, said screw 14 being locked in the desired position by means of nut 15.

In this manner the adjustable bearing causes the volume of the bellows to vary in accordance with impulses from one or more sensors which sense the travelling web. The bearing may be mounted in any position, and a positive and linear movement of the bearing is achieved.

In place of the illustrated bearing by means of rolls 19 and grooves 20, it is naturally possible to use other suitable bearing types, for example, guides possibly provided with ball bearings or needle bearings.

Having described my invention, I claim:

1. Adjustable bearing for lateral control of travelling webs, for example, a paper wire, said bearing comprising pneumatical or hydraulical operated displacement bellow means arranged on either side of a bearing between the bearing and a base, characterised in that the bearing is displaceably mounted in the base by means of in the bellow means encapsulated linear displacement bearings.

2. Adjustable bearing according to claim 1, characterised in that the bearing is provided on either side with a projecting portion having grooves for receiving and cooperating with correspondingly dimensioned rolls mounted in the base, thus establishing the said linear displacement bearings.

References Cited

UNITED STATES PATENTS 2,255,172    9/1941   Johnson _____ 308—121

FRED C. MATTERN, JR., Primary Examiner

F. SUSKO, Assistant Examiner